(12) United States Patent
Jacobs et al.

(10) Patent No.: US 6,646,895 B1
(45) Date of Patent: Nov. 11, 2003

(54) BIAS SUPPLY CIRCUIT AND A SWITCHING POWER SUPPLY EMPLOYING THE SAME

(75) Inventors: Mark E. Jacobs, Dallas, TX (US); Robert J. Murphy, Jr., Quinlan, TX (US); Ramanujam Ramabhadran, Rowlett, TX (US); Thomas G. Wang, Plano, TX (US); Shashank S. Wekhande, Garland, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 148 days.

(21) Appl. No.: 10/057,326

(22) Filed: Oct. 25, 2001

(51) Int. Cl.[7] ............................................. H02M 3/335
(52) U.S. Cl. .................................................. 363/21.08
(58) Field of Search ........................ 363/16, 20, 21.01, 363/21.04, 21.08, 95, 97, 131; 323/320, 324

(56) References Cited

U.S. PATENT DOCUMENTS

| | | | |
|---|---|---|---|
| RE36,571 E | 2/2000 | Rozman | |
| 6,181,577 B1 * | 1/2001 | Chen et al. | 363/21 |
| 6,208,534 B1 * | 3/2001 | Shteynberg et al. | 363/21 |
| 6,466,461 B2 * | 10/2002 | Mao et al. | 363/21.08 |
| 6,510,062 B2 * | 1/2003 | Goder et al. | 363/21.11 |

* cited by examiner

*Primary Examiner*—Matthew V. Nguyen

(57) ABSTRACT

A bias supply circuit and a method of operating a bias supply circuit for use with a switching power supply employing a main switch and an auxiliary switch and having an input voltage and a voltage across a clamp capacitor coupled to a transformer. In one embodiment, the bias supply circuit includes a bias supply winding associated with the transformer and configured to provide a first voltage dependent on at least one of the input voltage and the voltage across the clamp capacitor during a conduction period of the main switch or the auxiliary switch. Additionally, the bias supply circuit further includes a bias supply storage capacitor coupled to the bias supply winding and configured to provide a second voltage dependent on at least another of the input voltage and the voltage across the clamp capacitor during a conduction period of another of the main switch or the auxiliary switch. A sum of the first voltage and the second voltage provides a bias supply voltage.

33 Claims, 7 Drawing Sheets

BIAS SUPPLY CIRCUIT AND A SWITCHING POWER SUPPLY EMPLOYING THE SAME

TECHNICAL FIELD OF THE INVENTION

The present invention is directed, in general, to power electronics and, more specifically, to a bias supply circuit, method of operating a bias supply circuit and a switching power supply employing the circuit and method.

BACKGROUND OF THE INVENTION

The electronics industry continues to develop smaller and more powerful equipment that perform many functions, which in turn may require increasingly more power from smaller, more compact power supplies. Additionally, such a power supply may also have internal bias supply requirements for additional voltages that are different from the main power supply voltages. Bias supplies are used in power supplies to provide operating voltages needed by internal power control circuits or other circuits that provide proper operation during start-up or sustained power supply operation. Bias supply voltages and power requirements typically add another level of complexity to an already demanding environment.

There are several present options for deriving a bias supply voltage such as that needed for control circuits that may be used in a small power supply unit. Typically, bias supply voltages of roughly 12 volts are often required. The voltage regulation accuracy requirement of such bias supplies is often in the neighborhood of ten percent. This tolerance requirement is more accurate than a simple unregulated approach will typically provide when based on the unregulated input voltage to the power supply.

A common approach, that is often not efficient, uses a dissipative regulator coupled to the input voltage source of the power supply. An alternative having better efficiency but requiring small but separate magnetics develops the bias voltage from an independent switching bias supply. A third approach uses a voltage developed in a winding coupled to an output inductor. This voltage may then be regulated further with a dissipative regulator. This particular approach possesses the disadvantage of needing to maintain safety separations of primary and secondary conductors wherein elements of the circuit are on both sides of the primary-secondary safety boundary of a power transformer.

A fourth approach may use a winding on the main power transformer that also employs a dissipative regulator. Other approaches using charge pumps, for example, also suffer from general inefficiencies. All of these approaches provide either poor efficiency or require numerous parts. Additionally, routing paths between the primary and secondary safety isolation regions of a printed wiring board wastes valuable board space in high density designs.

Accordingly, what is needed in the art is a bias supply circuit and method of providing a bias supply voltage that overcomes the deficiencies in the prior art. For instance, an approach that can be self-contained within the primary-side safety region of the power unit, that provides high efficiency without introducing new magnetic elements and does not require a separate regulation mechanism would be advantageous.

SUMMARY OF THE INVENTION

To address the above-discussed deficiencies of the prior art, the present invention provides a bias supply circuit for use with a switching power supply. The switching power supply employs a main switch and an auxiliary switch and has an input voltage and a voltage across a clamp capacitor coupled to a transformer. In one embodiment, the bias supply circuit includes a bias supply winding associated with the transformer and configured to provide a first voltage dependent on at least one of the input voltage and the voltage across the clamp capacitor during a conduction period of the main switch or the auxiliary switch. Additionally, the bias supply circuit further includes a bias supply storage capacitor coupled to the bias supply winding and configured to provide a second voltage dependent on at least another of the input voltage and the voltage across the clamp capacitor during a conduction period of another of the main switch or the auxiliary switch. A sum of the first voltage and the second voltage provides a bias supply voltage.

In another aspect, the present invention provides a method of operating a bias supply circuit for use with a switching power supply employing a main switch and an auxiliary switch and having an input voltage and a voltage across a clamp capacitor coupled to a transformer. The method includes providing a first voltage associated with a bias supply winding of the transformer and dependent upon at least one of the input voltage and the voltage across the clamp capacitor during a conduction period of the main switch or the auxiliary switch. The method also includes providing a second voltage associated with a bias supply storage capacitor coupled to the bias supply winding and dependent upon at least another of the input voltage and the voltage across the clamp capacitor during a conduction period of another of the main switch or the auxiliary switch. The method further includes forming a bias supply voltage by summing the first voltage and the second voltage.

The present invention also provides, in yet another aspect, a switching power supply including a primary power supply circuit that employs a main switch and an auxiliary switch and that has an input voltage and a voltage across a clamp capacitor coupled to a transformer. The switching power supply also includes a secondary power supply circuit, coupled to the transformer, that provides an output voltage. The switching power supply further includes a bias supply circuit, having a bias supply winding associated with the transformer that is configured to provide a first voltage that is dependent on at least one of the input voltage and the voltage across the clamp capacitor during a conduction period of the main switch or the auxiliary switch. The bias supply circuit also has a bias supply storage capacitor, coupled to the bias supply winding, that is configured to provide a second voltage dependent on at least another of the input voltage and the voltage across the clamp capacitor during a conduction period of another of the main switch or the auxiliary switch. A sum of the first voltage and the second voltage provides a bias supply voltage.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
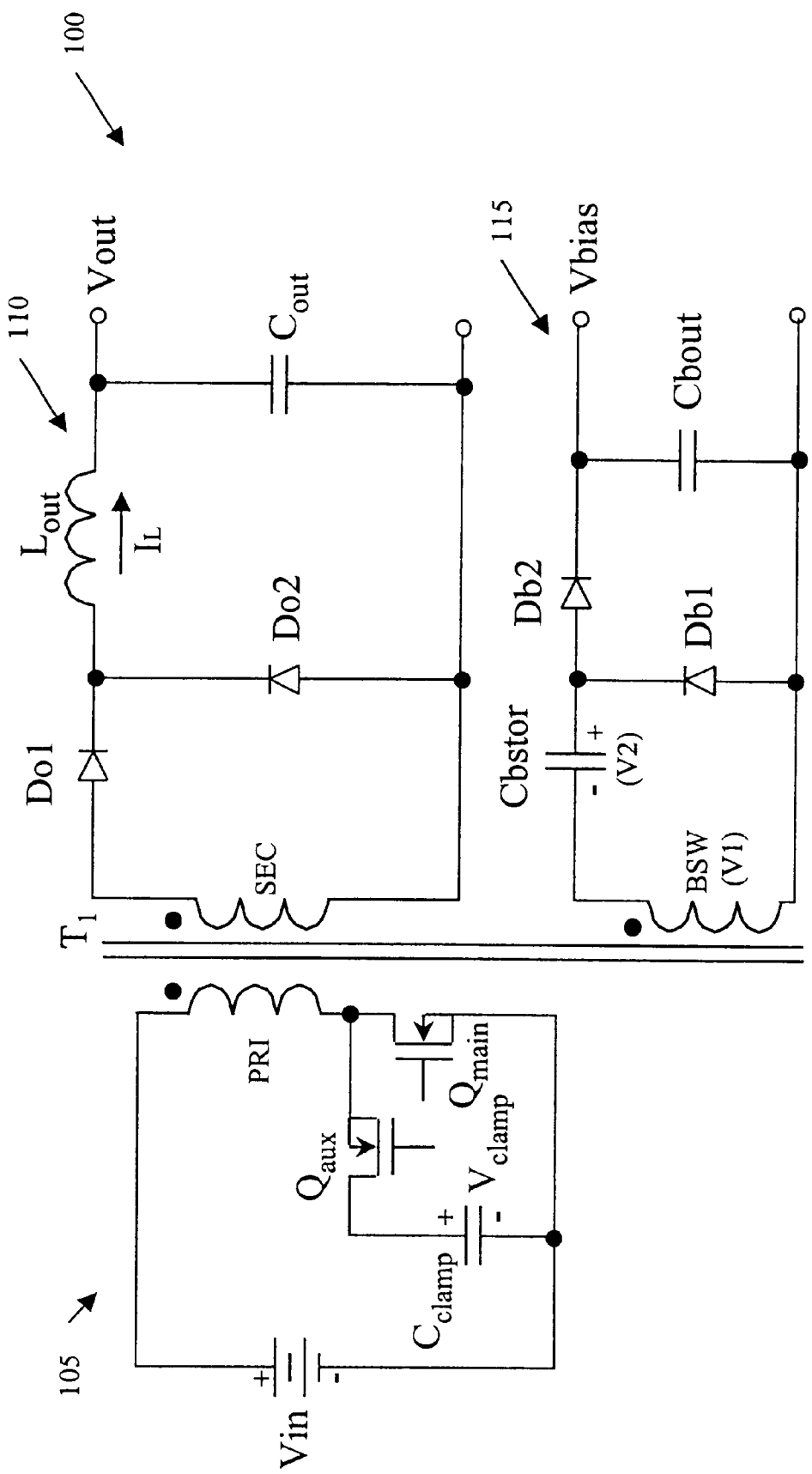
FIG. 1A illustrates a schematic diagram of an embodiment of a switching power supply constructed in accordance with the principles of the present invention.

Referring initially to FIG. 1A, illustrated is a schematic diagram of an embodiment of a switching power supply, generally designated 100, constructed in accordance with the principles of the present invention. The switching power supply 100 includes a primary power supply circuit 105, a secondary power supply circuit 110 and a bias supply circuit 115.

The primary power supply circuit 105 is coupled to an input voltage Vin and includes a primary winding PRI of a transformer T1, a main switch Qmain and an auxiliary switch Qaux that is series-coupled to a clamp capacitor Cclamp having a voltage Vclamp across it. In the illustrated embodiment, the auxiliary switch Qaux and the clamp capacitor Cclamp form an active clamp transformer reset circuit.

For the transformer winding senses shown in FIG. 1A, the primary power supply circuit 105 transfers power forward from the primary winding PRI to the secondary winding SEC during conduction of the main switch Qmain thereby providing a forward portion of an overall switching cycle. The main switch Qmain connects the input voltage Vin across the primary winding PRI for a main conduction period Tmain. At the conclusion of the main conduction period Tmain, the primary winding PRI is coupled across a difference between the input voltage Vin and the voltage Vclamp across the clamp capacitor Cclamp.

This action is accomplished by the auxiliary switch Qaux, which conducts for an auxiliary conduction period Taux. The auxiliary conduction period Taux represents a transformer reset portion of the overall switching cycle that is substantially mutually exclusive of the main conduction period Tmain. Of course, one skilled in the pertinent art realizes that there may be a small overlap in the main and auxiliary conduction periods due to associated transition times or switching delays. The clamp capacitor Cclamp allows the magnetic flux through the core of the transformer T1 to be substantially reset to a predetermined value at the beginning of the main conduction period Tmain. For additional information concerning the operation of main and auxiliary switches see U.S. Patent RE36,571, titled "Low loss synchronous rectifier for application to clamped-mode power converters" and herein incorporated by reference.

The secondary power supply circuit 110 provides an output voltage Vout and includes a secondary winding SEC of the transformer T1, first and second output diodes Do1, Do2, an output inductor Lout and an output capacitor Cout. For the transformer winding senses shown in FIG. 1A, the secondary power supply circuit 110 couples a secondary voltage Vsec, associated with the secondary winding SEC, to the first output diode Do1 during the main conduction period Tmain.

The secondary voltage Vsec is coupled through the first output diode Do1 to the output inductor Lout. Then, during the auxiliary conduction period Taux, the output inductor current $I_L$ flows through the second output diode Do2. A major portion of the output inductor current $I_L$ flows through a load (not shown) connected to the output voltage Vout. An AC portion of the output inductor current $I_L$ flows through the output capacitor Cout, which provides a filtering function to the output voltage Vout.

The bias supply circuit 115 provides a bias supply voltage Vbias and includes a bias supply winding BSW associated with the transformer T1, a bias supply storage capacitor Cbstor, first and second bias supply diodes Db1, Db2 and a bias voltage output capacitor Cbout. As a general condition, the bias supply winding BSW is configured to provide a first voltage V1 that is dependent on at least one of the input voltage Vin and the voltage Vclamp across the clamp capacitor Cclamp during either the main conduction period Tmain or the auxiliary conduction period Taux.

Additionally the bias supply storage capacitor Cbstor, which is coupled to the bias supply winding BSW through the first bias supply diode Db1, is configured to provide a second voltage V2 that is dependent on at least the other of the input voltage Vin and the voltage Vclamp across the clamp capacitor Cclamp during the other of the main conduction period Tmain or the auxiliary conduction period Taux. A sum of the first voltage V1 and the second voltage V2 then provides the bias supply voltage Vbias.

For the transformer winding senses shown in the embodiment of FIG. 1A, the bias supply winding BSW provides the first voltage V1 in a manner that is dependent substantially only on the input voltage Vin during the main conduction period Tmain. During the auxiliary conduction period Taux, the bias supply winding BSW provides the second voltage V2 in a manner that is dependent on a difference between the input voltage Vin and the voltage Vclamp across the clamp capacitor Cclamp during the auxiliary conduction period Taux. The second voltage V2 is stored on the bias supply storage capacitor Cbstor. The first and second voltages V1, V2 are effectively summed and coupled to the bias voltage output capacitor Cbout through the second bias supply diode Db2 during the main conduction period Tmain.

In an alternative embodiment, the voltage sense of the bias supply winding BSW may be reversed from the one shown in FIG. 1A. The bias supply winding BSW then provides the first voltage V1 in a manner that is dependent on the difference between the input voltage Vin and the voltage Vclamp across the clamp capacitor Cclamp during the auxiliary conduction period Taux. For this alternative arrangement, the bias supply storage capacitor Cbstor then provides the second voltage V2 in a manner that is dependent only on the input voltage Vin during the main conduction period Tmain.

Figure 1B:
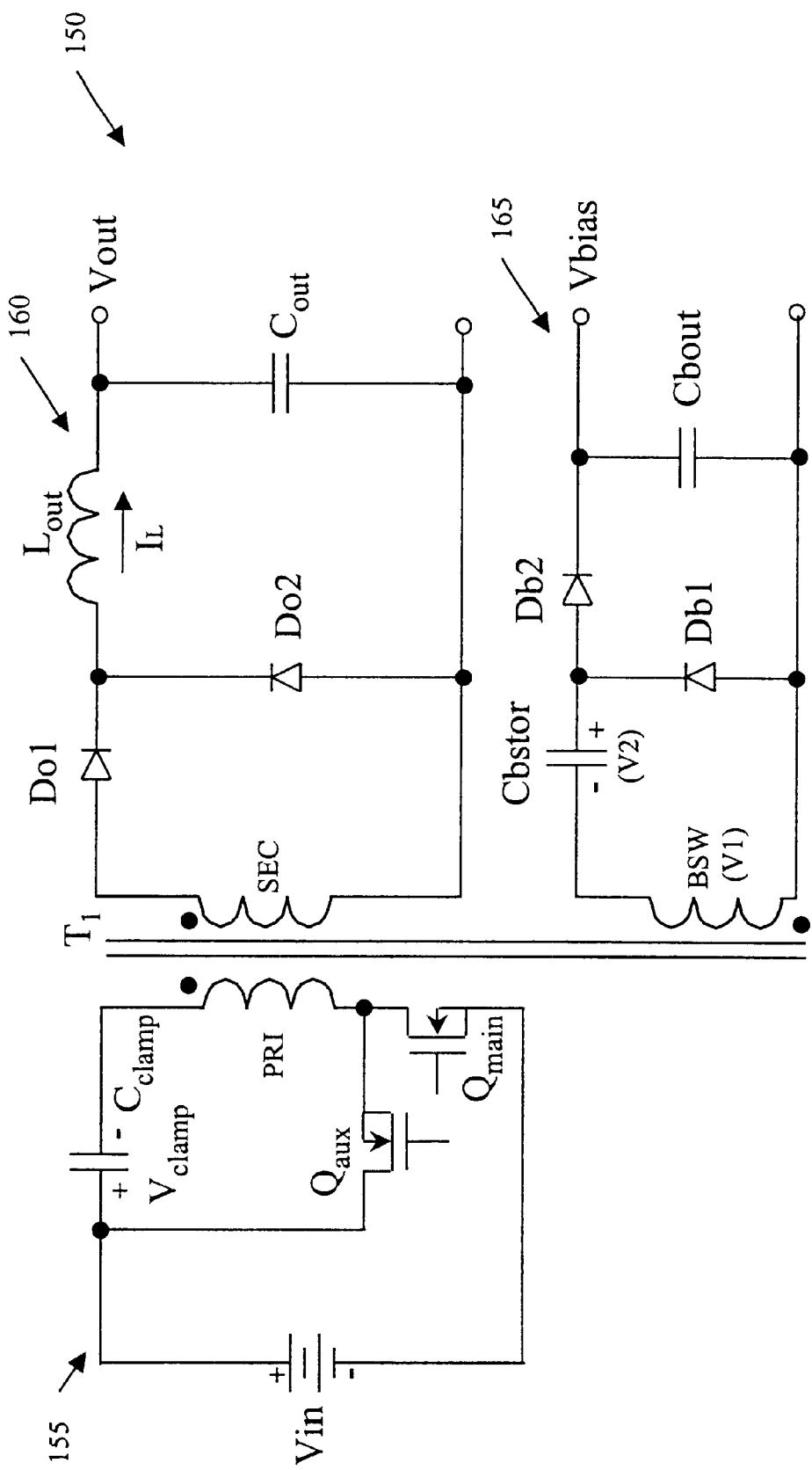
FIG. 1B illustrates a schematic diagram of an alternative embodiment of a switching power supply constructed in accordance with the principles of the present invention.

Turning now to FIG. 1B, illustrated is a schematic diagram of an alternative embodiment of a switching power supply, generally designated 150, constructed in accordance with the principles of the present invention. The switching power supply 150 includes a primary power supply circuit 155, a secondary power supply circuit 160 and a bias supply circuit 165. The primary power supply circuit 155 provides an alternative embodiment to the primary power supply circuit 105 of FIG. 1A. Additionally, the the switching power supply 150 provides an opposite transformer winding sense for the bias supply circuit 165, as compared to FIG. 1A.

The primary power supply circuit 155 is coupled to an input voltage Vin and includes a primary winding PRI of a transformer T1, a main switch Qmain and an auxiliary switch Qaux that is coupled to a clamp capacitor Cclamp having a voltage Vclamp across it. In the illustrated embodiment, the auxiliary switch Qaux and the clamp capacitor Cclamp also form an active clamp transformer reset circuit.

For the transformer winding senses shown in FIG. 1B, the primary power supply circuit 155 transfers power forward from the primary winding PRI to the secondary winding SEC during conduction of the main switch Qmain, thereby providing a forward portion of an overall switching cycle. For this case, the main switch Qmain connects a difference between the input voltage Vin and a voltage Vclamp across the clamp capacitor Cclamp to the primary winding PRI for a main conduction period Tmain. In a similar manner, the primary winding PRI is coupled to the voltage Vclamp across the clamp capacitor Cclamp by the auxiliary switch Qaux for an auxiliary conduction period Taux.

Employing the primary power supply circuit 155, the secondary power supply circuit 160 couples the secondary voltage Vsec to the first output diode Do1 during the main conduction period Tmain, as discussed with respect to FIG. 1A. Although the basic operation of the secondary power supply circuit 160 is the same as discussed previously, the secondary voltage Vsec is now dependent on a difference between the input voltage Vin and the voltage Vclamp across the clamp capacitor Cclamp during the main conduction period Tmain. Also, the secondary voltage Vsec is dependent solely on the voltage Vclamp across the clamp capacitor Cclamp during the auxiliary conduction period Taux.

The bias supply circuit 165 provides a bias supply voltage Vbias and includes a bias supply winding BSW associated with the transformer T1, a bias supply storage capacitor Cbstor, first and second bias supply diodes Db1, Db2 and a bias voltage output capacitor Cbout. Generally, as discussed with respect to FIG. 1A, the bias supply winding BSW is configured to provide a first voltage V1 that is dependent on at least one of the input voltage Vin and the voltage Vclamp across the clamp capacitor Cclamp during either the main conduction period Tmain or the auxiliary conduction period Taux.

Additionally the bias supply storage capacitor Cbstor, which is coupled to the bias supply winding BSW through the first bias supply diode Db1, is configured to provide a second voltage V2 that is dependent on at least the other of the input voltage Vin and the voltage Vclamp across the clamp capacitor Cclamp during the other of the main conduction period Tmain or the auxiliary conduction period Taux. A sum of the first voltage V1 and the second voltage V2 then provides the bias supply voltage Vbias.

For the transformer winding senses shown in the embodiment of FIG. 1B, the bias supply winding BSW provides the first voltage V1 in a manner that is dependent on the voltage Vclamp across the clamp capacitor Cclamp during the auxiliary conduction period Taux. For this arrangement, the bias supply storage capacitor Cbstor provides the second voltage V2 in a manner that is dependent on the difference between the input voltage Vin and the voltage Vclamp across the clamp capacitor Cclamp during the main conduction period Tmain.

In an alternative embodiment, the voltage sense of the bias supply winding BSW may be reversed from the one shown in FIG. 1B. The bias supply winding BSW then provides the first voltage V1 in a manner that is dependent on the difference between the input voltage Vin and the voltage Vclamp across the clamp capacitor Cclamp during the main conduction period Tmain. For this alternative arrangement, the bias supply storage capacitor Cbstor then provides the second voltage V2 in a manner that is dependent on the voltage Vclamp across the clamp capacitor Cclamp during the auxiliary conduction period Taux.

When employing either the primary power supply circuit 105 of FIG. 1A or the primary power supply circuit 155 of FIG. 1B, the magnitudes of the first and second voltages V1, V2 typically may be different. Also, different voltage senses of the bias supply winding BSW as discussed with respect to FIGS. 1A and 1B provide differing voltage dependencies and therefore generally differing values for the first and second voltages V1, V2. Additionally, differing values of the main and auxiliary conduction periods Tmain, Taux also contribute to differing values of the first and second voltages V1, V2. Therefore, judicious adjustment of these parameters allows the values of the first and second voltages V1, V2 to form a sum for the bias supply voltage Vbias that may be substantially independent of or substantially constant for variations in the input voltage Vin.

Additionally, the value of the bias supply storage capacitor Cbstor may be selected for a given value of bias supply current associated with the bias supply circuits 115, 165. An appropriate adjustment in the capacitance value of the bias supply storage capacitor Cbstor allows an average value of the second voltage V2 to be reduced as a function of the bias supply current required. This adjustment provides an additional mechanism for the bias supply voltage Vbias that is independent of any additional conventional regulating circuits such as a series pass regulator or a clamp zener.

Figure 2A:
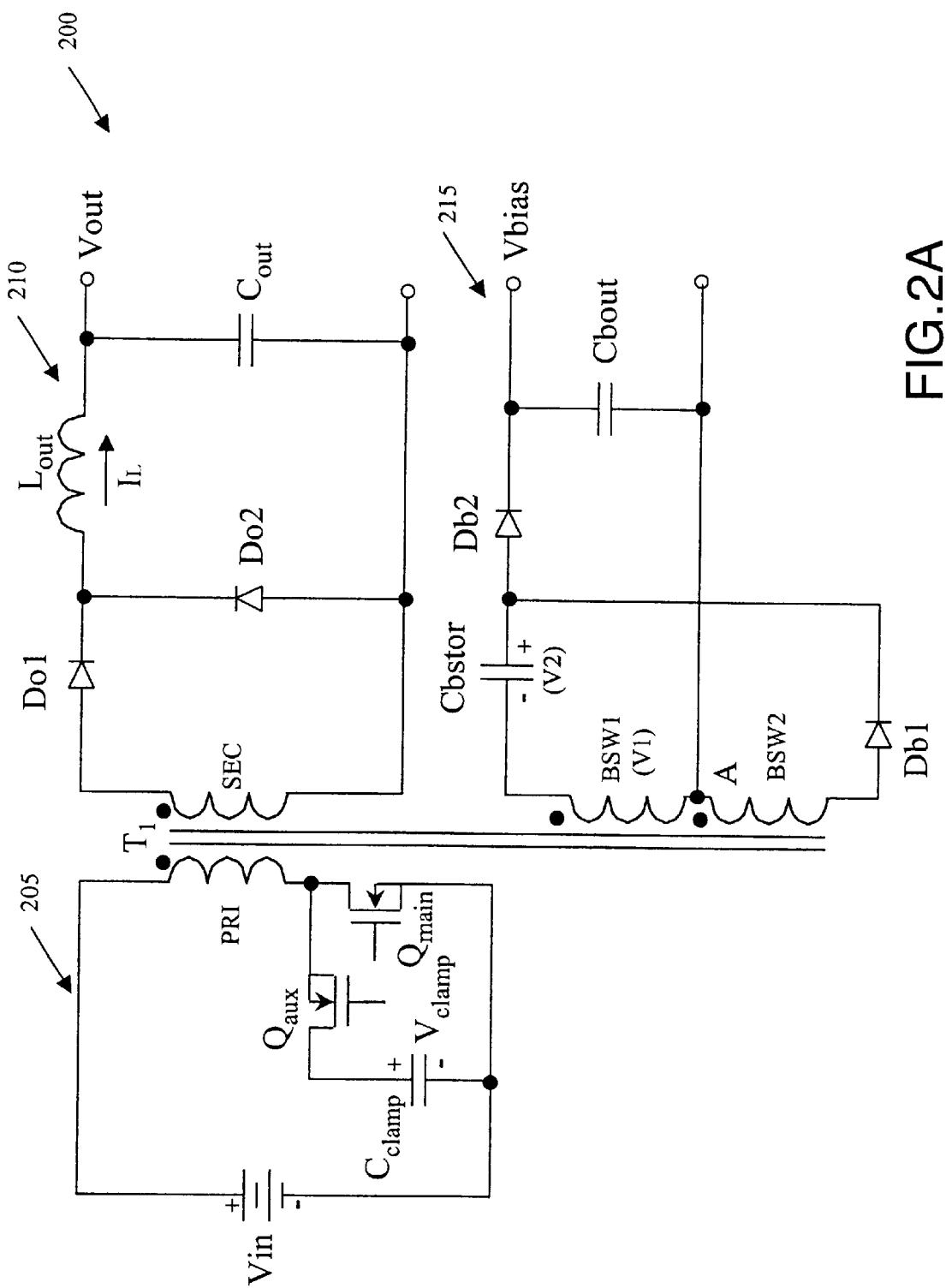
FIG. 2A illustrates a schematic diagram of another embodiment of a switching power supply employing an alternative embodiment of a bias supply circuit constructed in accordance with the principles of the present invention.

Turning now to FIG. 2A, illustrated is a schematic diagram of another embodiment of a switching power supply, generally designated 200, employing an alternative embodiment of a bias supply circuit constructed in accordance with the principles of the present invention. The switching power supply 200 includes a primary power supply circuit 205, a secondary power supply circuit 210 and a bias supply circuit 215.

The primary power supply circuit 205, the secondary power supply circuit 210 and their operating characteristics are analogous to their counterparts as discussed with respect to FIG. 1A. Similarly, an alternative embodiment may include reversing the transformer winding sense associated with the bias supply circuit 215 resulting in operating characteristics analogous to those described for this winding sense with respect to FIG. 1A. Additionally, an alternative embodiment of the switching power supply 200 may include a primary power supply circuit similar to the primary power supply circuit 155 of FIG. 1B also producing operating characteristics that are analogous with this condition.

The bias supply circuit 215 provides a bias supply voltage Vbias and includes first and second bias supply windings BSW1, BSW2 associated with the transformer T1, a bias supply storage capacitor Cbstor, first and second bias supply diodes Db1, Db2 and a bias voltage output capacitor Cbout. The bias supply circuit 215 includes the second bias supply winding BSW2 that is coupled to both the first bias supply winding BSW1 and the bias supply storage capacitor Cbstor. In this embodiment, a first voltage V1 is dependent on the first bias supply winding BSW1. A second voltage V2 is dependent on the first bias supply winding BSW1 and the second bias supply winding BSW2.

The first bias supply winding BSW1 is configured to provide the first voltage V1 dependent on the input voltage Vin during the main conduction period Tmain of the main switch Qmain. Additionally, the first and second bias supply windings BSW1, BSW2 cooperate to provide the second voltage V2 that is proportional to a difference between the input voltage Vin and a voltage Vclamp of the capacitor Cclamp during an auxiliary conduction period Taux of the auxiliary switch Qaux. The bias supply circuit 215 is arranged, in the illustrated embodiment, so that a sum of the first voltage V1 and the second voltage V2 provides the bias supply voltage Vbias. As shown in this embodiment, the first bias supply winding BSW1 and the second bias supply winding BSW2 employ separate windings of the transformer T1 that are coupled at a node A and coordinated to provide the first and second voltages V1, V2.

The polarity of the second voltage V2, during the auxiliary conduction period Taux, allows the first bias supply diode Db1 to conduct thereby charging the bias supply storage capacitor Cbstor. During this time, the second bias supply diode Db2 is back-biased (not conducting) thereby providing decoupling from the bias supply voltage Vbias.

Then, during the main conduction period Tmain, the polarity of the first bias supply winding BSW1 allows the first voltage V1 provided to be series-coupled to the value of the second voltage V2 that is stored across the bias supply storage capacitor Cbstor. This provides the sum of the first voltage V1 and the second voltage V2 to the bias supply output through the second bias supply diode Db2. During this time, the first bias supply diode Db1 is not conducting thereby decoupling the second bias supply winding BSW2. Therefore, power is also transferred forward from the primary power supply circuit 205 to the bias supply circuit 215 during conduction of the main switch Qmain. However, a portion of the value of the bias supply voltage Vbias is determined during conduction of the auxiliary switch Qaux, as explained above.

Figure 2B:
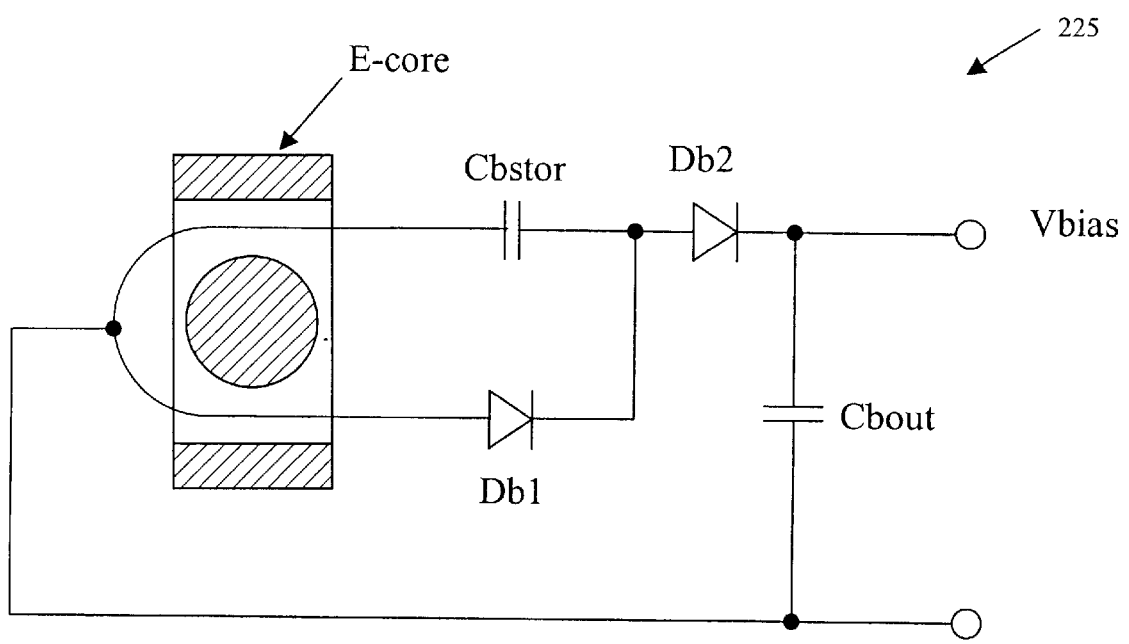
FIG. 2B illustrates a diagram of an embodiment of a bias supply circuit constructed in accordance with the principles of the present invention.

Turning now to FIG. 2B, illustrated is a diagram of an embodiment of a bias supply circuit, generally designated 225, that is constructed in accordance with the principles of the present invention. The bias supply circuit 225 may be employed with the switching power supply 200 of FIG. 2A or with another appropriate switching power supply. The bias supply circuit 225 is representative of the bias supply circuit 215 of FIG. 2A. An Ecore (shown in sectioned view in FIG. 2B) is associated with the transformer T1 of FIG. 2A wherein the primary and secondary windings PRI, SEC have been omitted for simplicity.

The bias supply circuit 225 of FIG. 2B is representative of first and second bias supply windings BSW1, BSW2 that comprise one-half turns apiece. This configuration provides a first voltage V1 that is dependent on a one-half turn winding, and a second voltage V2 that is dependent on the series connection of two one-half turn windings (i.e., a full turn winding). This configuration provides a bias supply voltage Vbias that may be substantially represented by a bias supply voltage curve 310 as discussed with respect to FIG. 3 below.

Figure 3:
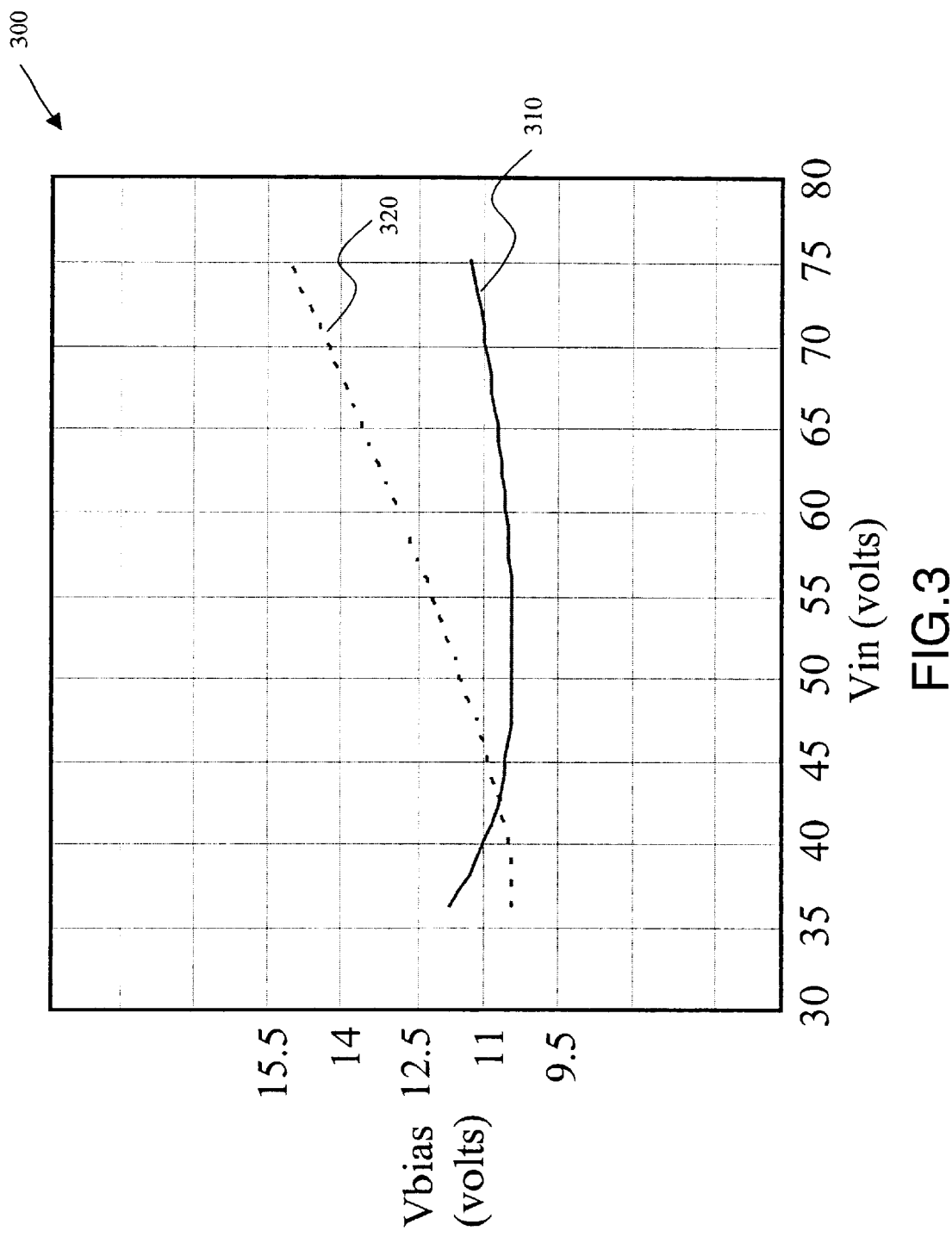
FIG. 3 illustrates a graphical representation showing first and second bias supply voltage curves that are representative of two embodiments of a bias supply circuit constructed in accordance to the principles of the present invention.

Turning now to FIG. 3, illustrated is a graphical representation, generally designated 300, showing first and second bias supply voltage curves 310, 320 that are representative of two embodiments of a bias supply circuit constructed in accordance with the principles of the present invention. The first and second bias supply voltage curves 310, 320 are representative of first and second exemplary sums of a first voltage V1 and a second voltage V2. These may represent first and second bias supply winding BSW1, BSW2 that have a different number of turns associated with an operation of a bias supply circuit, such as the embodiment of the bias supply circuit discussed with respect to FIG. 2A.

The first bias supply voltage curve 310 is illustrative of an embodiment wherein the changes in a first voltage V1 and a second voltage V2 essentially offset or counterbalance one another as an input voltage changes. This provides a first bias supply voltage Vbias1 that is substantially constant as an input voltage Vin varies. In this embodiment, the first voltage V1 increases with an increase in the input voltage Vin. Additionally, the second voltage V2 decreases with an increase in the input voltage Vin. This occurs since the reset voltage across the primary winding PRI of the transformer T1 decreases as the input voltage Vin increases.

A sum of the first voltage V1 and the second voltage V2, and therefore a first bias supply voltage Vbias1 for example, may be designed to be substantially independent of variations in the input voltage Vin over a range of input voltages as shown for the first bias supply voltage curve 310 of FIG. 3. In the first bias supply voltage curve 310, the transformer turns ratio of an associated first bias supply winding BSW1 to a second bias supply winding BSW2 may be 1:1. Additionally, the transformer turns ratio of an associated primary winding PRI to a secondary winding SEC may be 12:2 for a switching power supply having an input voltage Vin range of 36 to 72 volts. This arrangement provides an output voltage Vout from the power supply of about 3.3 volts.

The second bias supply voltage curve 320 is illustrative of an embodiment wherein the first voltage V1 increases more than the second voltage V2 decreases. This may be accomplished by selecting a different transformer turns ratio for the first and second bias supply windings BSW1, BSW2. This condition yields the second sum and therefore a second bias supply voltage Vbias2 that increases with an increase in the input voltage Vin. This, of course, may occur due to the first voltage V1 increasing more than, or the second voltage V2 decreasing less than, their respective counterparts associated with the first bias supply voltage Vbias1. Of course, other bias supply voltages, having differing characteristics, may also be constructed as appropriate. These characteristics may depend on the selected transformer turns ratios or the voltage senses of the transformer windings.

Figure 4:
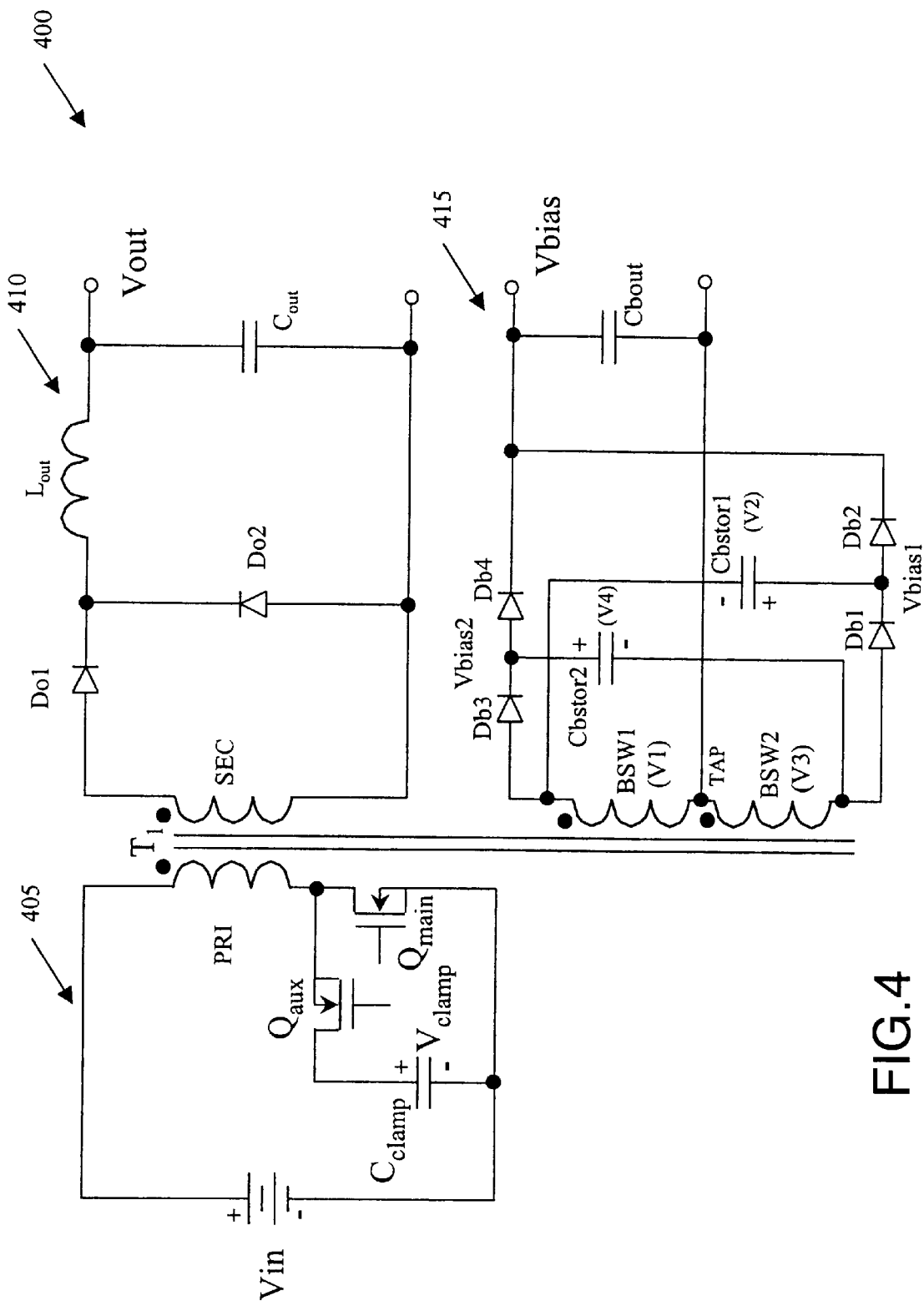
FIG. 4 illustrates a schematic diagram of an another embodiment of a switching power supply employing an alternative embodiment of a bias supply circuit constructed in accordance with the principles of the present invention.

Turning now to FIG. 4, illustrated is a schematic diagram of another embodiment of a switching power supply, generally designated 400, employing an alternative embodiment of a bias supply circuit constructed in accordance with the principles of the present invention. The switching power supply 400 includes a primary power supply circuit 405, a secondary power supply circuit 410 and a bias supply circuit 415. The primary power supply circuit 405, the secondary power supply circuit 410 and their operating characteristics are analogous to their counterparts as discussed with respect to FIG. 1A.

The bias supply circuit 415 provides a bias supply voltage Vbias and includes first and second bias supply windings BSW1, BSW2 of the transformer T1, first and second bias supply storage capacitors Cbstor1, Cbstor2, first, second third and fourth bias supply diodes Db1, Db2, Db3, Db4 and a bias voltage output capacitor Cbout. In general for this embodiment, the second bias supply storage capacitor Cbstor2 is coupled to both the first bias supply winding BSW1 and the second bias supply winding BSW2 wherein the second bias supply winding BSW2 is configured to provide a third voltage V3. Additionally, a fourth voltage V4 is dependent on both the first bias supply winding BSW1 and the second bias supply winding BSW2 thereby allowing a sum of the third voltage V3 and the fourth voltage V4 to provide another bias supply voltage.

In the illustrated embodiment of the bias supply circuit 415, the first and second bias supply windings BSW1, BSW2 are representative of a winding of the transformer T1 employing a tap. Generation and summation of a first voltage V1 and a second voltage V2 to provide a first sum that yields a first bias supply voltage Vbias1 is analogous to the discussion presented with respect to FIG. 2A. Generation of the first and second voltages V1, V2 employs the first bias supply diode Db1 and the first bias supply storage capacitor Cbstor1.

In the illustrated embodiment, the bias supply circuit 415 produces a second sum consisting of the third voltage V3 and the fourth voltage V4 that provides the second bias supply voltage Vbias2. In the illustrated embodiment, the second bias supply winding BSW2 provides the third voltage V3 during the auxiliary conduction period Taux. The third voltage V3 is proportional to a difference between the input voltage Vin and a voltage Vclamp across the clamp capacitor Cclamp. The first and second bias supply windings BSW1, BSW2 cooperate to provide the fourth voltage V4 that is proportional to the input voltage Vin during a conduction period of the main switch Qmain. The fourth voltage V4 is stored on the second bias supply storage capacitor Cbstor2 during the main conduction period Tmain.

Then, the second sum, consisting of the third voltage V3 and the fourth voltage V4, is available to provide the second bias supply voltage Vbias2 during the auxiliary conduction period Taux. The bias supply circuit 415 employs the second and fourth bias supply diodes Db2, Db4 as a selection circuit that selects one (the greater of the two in this embodiment) of the first and second bias supply voltages Vbias1, Vbias2 to be the bias supply voltage Vbias. Of course, alternative embodiments may employ other selection criteria.

Figure 5:
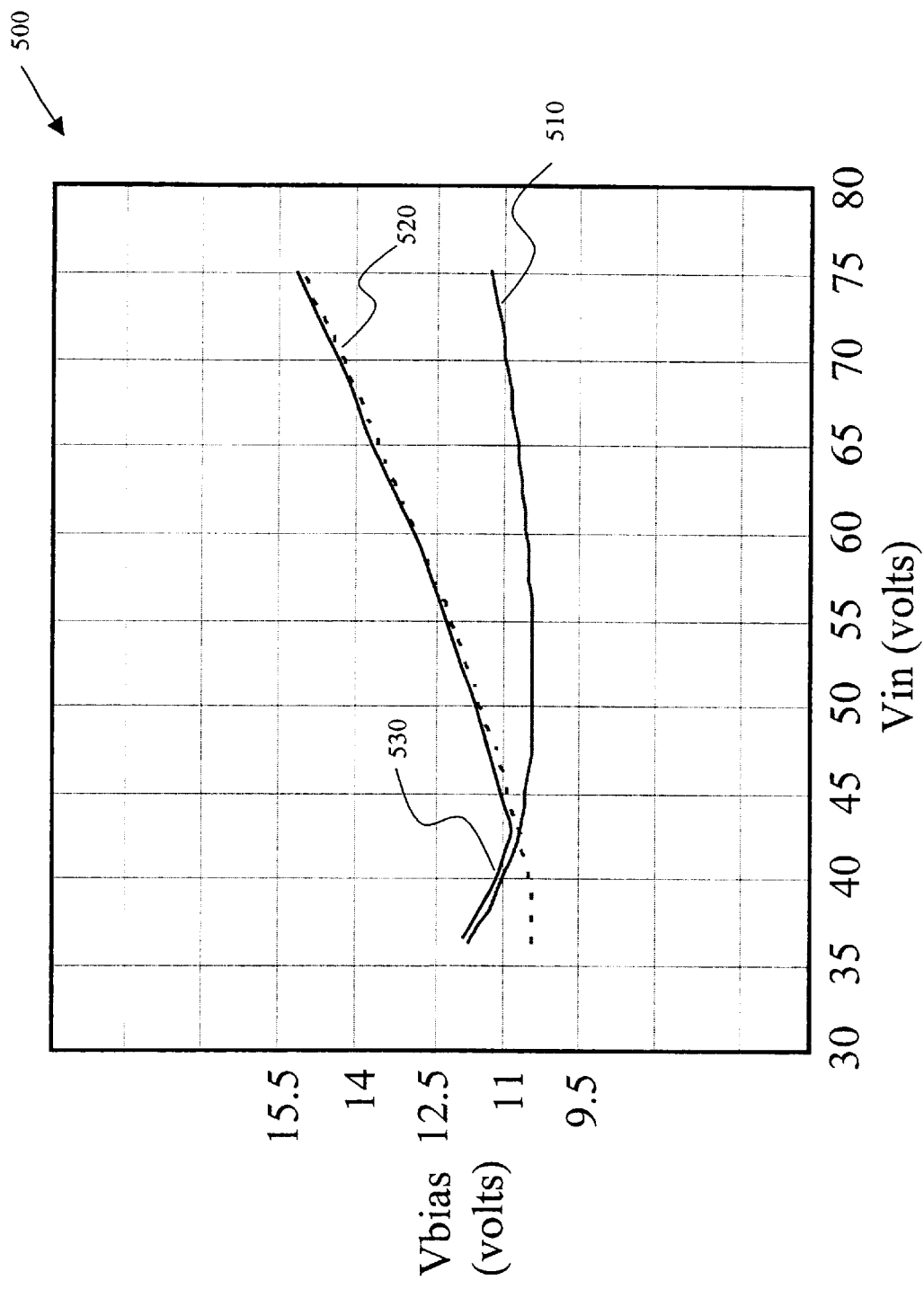
FIG. 5 illustrates a graphical representation showing bias supply voltage curves representative of an embodiment of a bias supply circuit constructed in accordance with the principles of the present invention.

Turning now to FIG. 5, illustrated is a graphical representation, generally designated 500, showing bias supply voltage curves representative of an embodiment of a bias supply circuit constructed in accordance with the principles of the present invention. First and second bias supply voltage curves 510, 520 may be representative of a first sum and a second sum respectively, such as those presented and discussed with respect to FIG. 4. Then, a third bias supply voltage curve 530 (slightly displaced for clarity) would be representative of a bias supply voltage Vbias that is the greater of the first sum and the second sum.

In summary, several embodiments of a bias supply circuit have been presented that are constructed in accordance with the principles of the present invention. These embodiments demonstrate the ability to tailor or shape a bias supply voltage that may be substantially independent of variations in an input voltage without requiring a separate regulation mechanism. Additionally, a bias supply so constructed typically provides higher efficiencies without introducing new magnetic elements or the need for a separate voltage-regulating mechanism. Such a bias supply is also applicable to deriving a bias voltage on either side of a safety boundary between primary and secondary safety isolation regions. While specific embodiments of a bias supply circuit, a switching power supply and component parts have been illustrated and described, other embodiments are well within the broad scope of the present invention.

For a better understanding of power electronics including power supplies and conversion technologies see *Principles of Power Electronics*, by J. G. Kassakian, M. F. Schlecht and G. C. Verghese, Addison-Wesley (1991). The aforementioned reference is herein incorporated by reference.

Although the present invention has been described in detail, those skilled in the art should understand that they can make various changes, substitutions and alterations herein without departing from the spirit and scope of the invention in its broadest form.

What is claimed is:

1. A bias supply circuit for use with a switching power supply employing a main switch and an auxiliary switch and having an input voltage and a voltage across a clamp capacitor coupled to a transformer, comprising:
 a bias supply winding associated with said transformer and configured to provide a first voltage dependent on at least one of said input voltage and said voltage across said clamp capacitor during a conduction period of said main switch or said auxiliary switch; and
 a bias supply storage capacitor coupled to said bias supply winding and configured to provide a second voltage dependent on at least another of said input voltage and said voltage across said clamp capacitor during a conduction period of another of said main switch or said auxiliary switch, thereby allowing a sum of said first voltage and said second voltage to provide a bias supply voltage.

2. The bias supply circuit as recited in claim 1 wherein said first voltage is dependent on said input voltage during a conduction period of said main switch, and said second voltage is dependent on a difference between said input voltage and said voltage across said clamp capacitor during a conduction period of said auxiliary switch.

3. The bias supply circuit as recited in claim 1 wherein said first voltage is dependent on a difference between said input voltage and said voltage across said clamp capacitor during a conduction period of said auxiliary switch, and said second voltage is dependent on said input voltage during a conduction period of said main switch.

4. The bias supply circuit as recited in claim 1 wherein said first voltage is dependent on a difference between said input voltage and said voltage across said clamp capacitor during a conduction period of said main switch, and said second voltage is dependent on said voltage across said clamp capacitor during a conduction period of said auxiliary switch.

5. The bias supply circuit as recited in claim 1 wherein said first voltage is dependent on said voltage across said clamp capacitor during a conduction period of said auxiliary switch, and said second voltage is dependent on a difference between said input voltage and said voltage across said clamp capacitor during a conduction period of said main switch.

6. The bias supply circuit as recited in claim 1 wherein said bias supply winding comprises a one-half turn winding.

7. The bias supply circuit as recited in claim 1 further comprising another bias supply winding coupled to said bias supply winding and said bias supply storage capacitor wherein said first voltage is dependent on said bias supply winding, and said second voltage is dependent on said bias supply winding and said another bias supply winding thereby allowing a sum of said first voltage and said second voltage to provide a bias supply voltage.

8. The bias supply circuit as recited in claim 7 further comprising another bias supply storage capacitor coupled to said bias supply winding and said another bias supply winding configured to provide a third voltage dependent on said another bias supply winding, and a fourth voltage dependent on said bias supply winding and said another bias supply winding thereby allowing a sum of said third voltage and said fourth voltage to provide another bias supply voltage.

9. The bias supply circuit as recited in claim 7 wherein said bias supply winding and said another bias supply winding employ separate windings.

10. The bias supply circuit as recited in claim 7 wherein said bias supply winding and said another bias supply winding employ a common winding having a tap.

11. The bias supply circuit as recited in claim 8 further comprising a selection circuit that selects one of said bias supply voltage and said another bias supply voltage.

12. A method of operating a bias supply circuit for use with a switching power supply employing a main switch and an auxiliary switch and having an input voltage and a voltage across a clamp capacitor coupled to a transformer, comprising:
providing a first voltage associated with a bias supply winding of said transformer and dependent upon at least one of said input voltage and said voltage across said clamp capacitor during a conduction period of said main switch or said auxiliary switch;
providing a second voltage associated with a bias supply storage capacitor coupled to said bias supply winding and dependent upon at least another of said input voltage and said voltage across said clamp capacitor during a conduction period of another of said main switch or said auxiliary switch; and
forming a bias supply voltage by summing said first voltage and said second voltage.

13. The method as recited in claim 12 wherein said first voltage is dependent on said input voltage during a conduction period of said main switch, and said second voltage is dependent on a difference between said input voltage and said voltage across said clamp capacitor during a conduction period of said auxiliary switch.

14. The method as recited in claim 12 wherein said first voltage is dependent on a difference between said input voltage and said voltage across said clamp capacitor during a conduction period of said auxiliary switch, and said second voltage is dependent on said input voltage during a conduction period of said main switch.

15. The method as recited in claim 12 wherein said first voltage is dependent on a difference between said input voltage and said voltage across said clamp capacitor during a conduction period of said main switch, and said second voltage is dependent on said voltage across said clamp capacitor during a conduction period of said auxiliary switch.

16. The method as recited in claim 12 wherein said first voltage is dependent on said voltage across said clamp capacitor during a conduction period of said auxiliary switch, and said second voltage is dependent on a difference between said input voltage and said voltage across said clamp capacitor during a conduction period of said main switch.

17. The method as recited in claim 12 wherein said bias supply winding comprises a one-half turn winding.

18. The method as recited in claim 12 further comprising:
providing said first voltage dependent on said bias supply winding;
providing said second voltage dependent on said bias supply winding and another bias supply winding; and
forming a bias supply voltage by summing said first voltage and said second voltage.

19. The method as recited in claim 18 further comprising:
providing a third voltage dependent on said another bias supply winding;
providing a fourth voltage dependent on another bias supply storage capacitor coupled to said bias supply winding and said another bias supply winding; and
forming another bias supply voltage by summing said third voltage and said fourth voltage.

20. The method as recited in claim 18 wherein said bias supply winding and said another bias supply winding employ separate windings.

21. The method as recited in claim 18 wherein said bias supply winding and said another bias supply winding employ a common winding having a tap.

22. The method as recited in claim 19 further comprising a selection circuit that selects one of said bias supply voltage and said another bias supply voltage.

23. A switching power supply, comprising:
a primary power supply circuit that employs a main switch and an auxiliary switch and that has an input voltage and a voltage across a clamp capacitor coupled to a transformer;
a secondary power supply circuit coupled to said transformer that provides an output voltage; and
a bias supply circuit, including:
a bias supply winding associated with said transformer that is configured to provide a first voltage dependent on at least one of said input voltage and said voltage across said clamp capacitor during a conduction period of said main switch or said auxiliary switch; and
a bias supply storage capacitor coupled to said bias supply winding that is configured to provide a second voltage dependent on at least another of said input voltage and said voltage across said clamp capacitor during a conduction period of another of said main switch or said auxiliary switch, thereby allowing a sum of said first voltage and said second voltage to provide a bias supply voltage.

24. The switching power supply as recited in claim 23 wherein said first voltage is dependent on said input voltage during a conduction period of said main switch, and said second voltage is dependent on a difference between said input voltage and said voltage across said clamp capacitor during a conduction period of said auxiliary switch.

25. The switching power supply as recited in claim 23 wherein said first voltage is dependent on a difference between said input voltage and said voltage across said clamp capacitor during a conduction period of said auxiliary switch, and said second voltage is dependent on said input voltage during a conduction period of said main switch.

26. The switching power supply as recited in claim 23 wherein said first voltage is dependent on a difference between said input voltage and said voltage across said clamp capacitor during a conduction period of said main switch, and said second voltage is dependent on said voltage across said clamp capacitor during a conduction period of said auxiliary switch.

27. The switching power supply as recited in claim 23 wherein said first voltage is dependent on said voltage across said clamp capacitor during a conduction period of said auxiliary switch, and said second voltage is dependent on a difference between said input voltage and said voltage across said clamp capacitor during a conduction period of said main switch.

28. The switching power supply as recited in claim 23 wherein said bias supply winding comprises a one-half turn winding.

29. The switching power supply as recited in claim 23 further comprising another bias supply winding coupled to said bias supply winding and said bias supply storage capacitor wherein said first voltage is dependent on said bias supply winding, and said second voltage is dependent on said bias supply winding and said another bias supply winding thereby allowing a sum of said first voltage and said second voltage to provide a bias supply voltage.

30. The switching power supply as recited in claim 29 further comprising another bias supply storage capacitor coupled to said bias supply winding and said another bias supply winding configured to provide a third voltage dependent on said another bias supply winding, and a fourth voltage dependent on said bias supply winding and said another bias supply winding thereby allowing a sum of said third voltage and said fourth voltage to provide another bias supply voltage.

31. The switching power supply as recited in claim 29 wherein said bias supply winding and said another bias supply winding employ separate windings.

32. The switching power supply as recited in claim 29 wherein said bias supply winding and said another bias supply winding employ a common winding having a tap.

33. The bias supply circuit as recited in claim 30 further comprising a selection circuit that selects one of said bias supply voltage and said another bias supply voltage.

* * * * *